June 24, 1947.  W. R. PETERS  2,422,848
TIRE LIFTING TOOL
Filed March 19, 1945
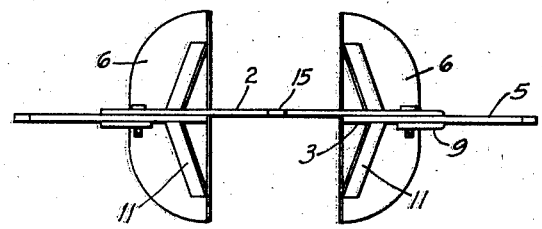
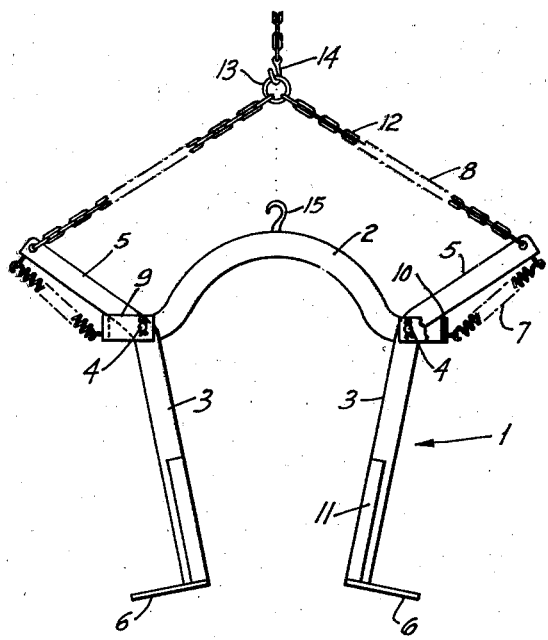
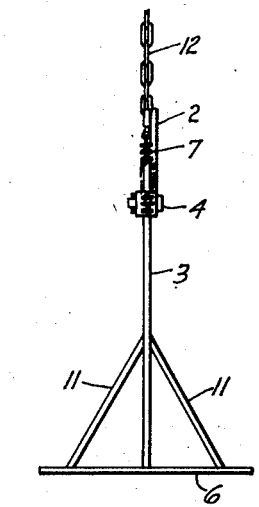
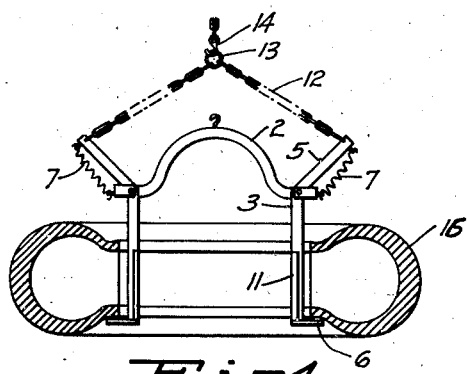
INVENTOR.
WILLIAM R. PETERS
BY *A. Schapp*
ATTORNEY Patented June 24, 1947

2,422,848

UNITED STATES PATENT OFFICE 2,422,848

TIRE LIFTING TOOL

William R. Peters, Yreka, Calif.

Application March 19, 1945, Serial No. 583,572

3 Claims. (Cl. 294—97)

The present invention relates to improvements in a tire lifting tool, and its principal object is to provide a tool whereby a tire may be conveniently and safely lifted and carried from one place to another.

My tire lifting tool was invented particularly for use in connection with re-capping machines for heavy tires weighing from 150 to 300 pounds, where the removal of a hot tire from the re-capping machine often becomes a hazardous task.

More particularly it is proposed to provide a tire lifting tool which may be lowered by a crane into proper position with respect to the tire to be lifted, and will automatically engage underneath the tire at the beginning of the lifting operation.

It is further proposed to provide a tire lifting tool which will automatically disengage from the tire after the latter has been deposited and lifting action has ceased.

A still further object of my invention is to provide a tire lifting tool which may be used for direct vertical lift of the tire from the re-capping machine or from any other location.

And finally, it is proposed to provide a tool of the character described which is simple in construction, positive in action, has few working parts, and may be manufactured at comparatively little expense.

Further objects and advantages of my invention will appear as the specification proceeds, and the novel features of my tire lifting device will be fully defined in the claims hereto attached.

The preferred form of my invention is illustrated in the accompanying drawing forming part of this application, in which:

Figure 1 shows a side view of my tire lifting tool;

Figure 2, an edge view of the same;

Figure 3, a top plan view of the same; and

Figure 4, a view on reduced scale showing my tool in lifting contact with a tire.

While I have shown only the preferred form of my invention, I wish to have it understood that various changes or modifications may be made within the scope of the claims hereto attached without departing from the spirit of the invention.

Referring to the drawing in detail, my tire lifting tool 1 comprises, in its principal features, a cross-member 2, a pair of tongs 3 pivoted in the cross-member, as at 4, arms 5 projecting from the tongs beyond the pivot, shoes 6 at the lower end of the tongs, springs 7 urging the lower ends of the tongs toward one another, and lifting means 8 tending to spread the shoes 6 apart when the device is lifted.

The cross-member 2 may be of any suitable form, and is here shown as being arcuate in its main body section, and as terminating in two horizontal end sections 9. The cross-member is preferably made of a flat bar, and the ends are turned upon themselves to form a channel in which the tongs 3 are received and supported by the pivot 4.

The tongs 3 are longer and heavier than the extensions or arms 5 and tend to normally hang in vertical position. However, the springs 7 attached to the outer ends of the arms 5 and to the ends of the cross-member 2 tend to crowd the lower ends of the tongs toward one another, as illustrated in Figure 1, this movement being limited by the arms 5 striking the bar of the cross-member where it is turned upon itself, as at 10.

The cross-member 2 may be of any suitable length, depending upon the diameter of the tire opening, and the spacing between the pivots 4 should be such that when the lower end of the tongs 3 are in retracted position, under the influence of the springs 7, the shoes 6, when lowered, will freely pass through the tire opening. In this position, the spacing between the extremities of the shoes corresponds substantially to that between the pivots 4.

It will be understood, of course, that these measurements do not have to be exact, and that the same tool may be used for different sizes of tires, since a little too much clearance is inconsequential, and, on the other hand, lack of complete clearance may be compensated for by a slight tilting of the device during the period of insertion.

The shoes 6 may be of any suitable form, and are shown here as flat flanges extending from the tongs at right angles, and shaped to substantially conform to the outline of the tire rim.

The shoes may be reinforced by means of suitable brackets or braces, indicated at 11.

The arms 5 of the tongs project outwardly and their extreme ends are interconnected by means of a chain 12 formed with a central ring 13 adapted to receive a hook 14 connected to a crane, not shown.

A hook 15 is connected directly to the cross-member 2 so as to allow the tool to be manipulated without calling into action its operating features.

The operaton of my invention may be readily understood from the foregoing description.

Figure 4 shows a tire 16 in position to be lifted. The tool is lowered through the tire opening with the chain 12 slacking to allow the spring 7 to pull the shoes 6 toward one another, so that they readily pass through the opening and in a plane underneath the tire rim.

Now, a lifting effect is exerted on the ring 13, and the chain 12 tightens and draws the arms 5 toward one another, thereby spreading the shoes 6 to catch underneath the tire rim, as shown in Figure 4.

Further lifting action will raise the tire which firmly rests on the shoes, and the tire may now be carried to a different location.

As soon as the tire is placed on a suitable support, and the chain 12 is slackened, the shoes 6 will be drawn toward one another again, and the tool may be readily released from the tire.

I claim:

1. A tool for lifting a horizontally disposed tire, comprising a cross-member having stops at the ends thereof, a pair of tongs suspended from the ends of the cross-members inside of the stops and having inclined arms extending outwardly, shoes at the lower ends of the tongs and adapted for engagement underneath the tire, springs attached to the ends of the cross member and the ends of the arms for pulling the arms into contact with the stops whereby the tongs are made to converge toward one another and the shoes are made free for lowering through the tire opening, and a chain connecting the upper ends of the arms for spreading the shoes to engage underneath the tire when upward pull is exerted on the chain.

2. A tool for lifting a horizontally disposed tire, comprising a cross-member having stops at the ends thereof, a pair of tongs suspended from the ends of the cross-members inside of the stops and having inclined arms extending outwardly, shoes at the lower ends of the tongs and adapted for engagement underneath the tire, springs attached to the ends of the cross-member and the ends of the arms for pulling the arms into contact with the stops, whereby the tongs are made to converge toward one another and the shoes are made free for lowering through the tire opening, and a chain connecting the upper ends of the arms for spreading the shoes to engage underneath the tire when upward pull is exerted on the chain, the springs and the stops being cooperable for normally bringing the shoe extremities substantially within the spacing of the suspension points of the tongs.

3. A tool for lifting a horizontally disposed tire, comprising a cross-member having stops at the ends thereof, a pair of tongs suspended from the ends of the cross-members inside of the stops and having inclined arms extending outwardly, shoes at the lower ends of the tongs and adapted for engagement underneath the tire, springs attached to the ends of the cross-member and the ends of the arms for pulling the arms into contact with the stops whereby the tongs are made to converge toward one another and the shoes are made free for lowering through the tire opening, and a chain connecting the upper ends of the arms for spreading the shoes to engage underneath the tire when upward pull is exerted on the chain, the cross-member having a hook whereby the tool may be raised and lowered with the parts in normal relation.

WILLIAM R. PETERS.

REFERENCES CITED

The following references are of record in the file of this patent:

UNITED STATES PATENTS

| Number | Name | Date |
| --- | --- | --- |
| 725,169 | Stephens | Apr. 14, 1903 |
| 976,652 | Hensley | Nov. 22, 1910 |
| 1,216,291 | Diescher | Feb. 20, 1917 |
| 1,493,953 | Dolgiano | May 13, 1924 |
| 1,544,011 | Kearns | June 30, 1924 |
| 2,078,819 | Van Brummelen | Apr. 27, 1937 |
| 2,349,689 | Aldrich | May 23, 1944 |
| 1,169,004 | Cargin | Jan. 18, 1916 |